United States Patent
Tanygin et al.

(10) Patent No.: US 7,224,311 B2
(45) Date of Patent: May 29, 2007

(54) SYSTEM AND METHOD FOR VISUALIZATION OF ATTITUDE AND ATTITUDE/POSITION DEPENDENT DATA

(75) Inventors: Sergei Tanygin, Malvern, PA (US); Haroon Rashid, New Castle, DE (US)

(73) Assignee: Analytical Graphics, Inc., Exton, PA (US)

( * ) Notice: Subject to any disclaimer, the term of this patent is extended or adjusted under 35 U.S.C. 154(b) by 21 days.

(21) Appl. No.: 11/212,547

(22) Filed: Aug. 26, 2005

(65) Prior Publication Data

US 2006/0256010 A1   Nov. 16, 2006

Related U.S. Application Data

(60) Provisional application No. 60/605,072, filed on Aug. 27, 2004.

(51) Int. Cl.
*G01S 5/02* (2006.01)
(52) U.S. Cl. .................................... 342/443
(58) Field of Classification Search ................ 342/16, 342/443, 451, 462; 455/65, 67.13; 244/164, 244/171
See application file for complete search history.

(56) References Cited

U.S. PATENT DOCUMENTS

| 6,227,496 | B1* | 5/2001 | Yoshikawa et al. ......... 244/171 |
| 6,489,898 | B1* | 12/2002 | Nicholls ..................... 340/975 |
| 2005/0057559 | A1* | 3/2005 | Komarechka ............... 345/418 |

* cited by examiner

*Primary Examiner*—Dao L. Phan
(74) *Attorney, Agent, or Firm*—Roberts Mardula & Wertheim, LLC

(57) ABSTRACT

A system and method for visualization of attitude dependent data is disclosed. An attitude sphere is defined around an object of interest located at the center. Grid points are defined on the surface of the attitude sphere to represent directions. An attitude dependent FOM result is mapped onto the sphere, which is color coded on the associated point to visualize attitude dependency. When used to analyze signals arriving at a receiver, the method accounts for motion of the receiver, the transmitter, and the signal sources. The objects comprise values of figures of merit (FOMs) that are accessible to a user. Additionally, the objects are updated dynamically to reflect the experience of the receiver over time. The receiver orientation may be optimized to minimize interference and jamming and/or to maximize signal strength of a desired signal.

9 Claims, 4 Drawing Sheets
(2 of 4 Drawing Sheet(s) Filed in Color)

200 ATTITUDE SPHERE

210 RECEIVER

SYSTEM AND METHOD FOR VISUALIZATION OF ATTITUDE AND ATTITUDE/POSITION DEPENDENT DATA

RELATED APPLICATIONS

This application claims the benefit of Provisional Application No. 60/605,072, filed Aug. 27, 2004 and hereby incorporated by reference.

BACKGROUND

Embodiments of the present invention are directed to the visualization of attitude and attitude/position dependent data. More particularly, embodiments of the present invention are directed to analyzing unwanted signals impinging on a receiver and to providing means to mitigate the effects such signals have on receiving desired signals.

Many problems encountered in the field of aerospace engineering deal with relative positioning, orientation and pointing of objects, e.g. orbit and attitude maneuvers, communications between satellites, ground stations, aircraft, etc. In order to fully investigate all relevant solutions, analyses are often repeated with various positions and orientations. These analyses are called parametric and typically involve plotting figures of merit (FOM) against varied parameters. Due to the amount of information involved, it can be challenging to succinctly depict and evaluate results of the analyses, e.g., the dependence of a communication link on position and attitude of a receiver relative to multiple signal sources over time.

The importance of radio communications cannot be understated. Voice communications, data communications, and video communications, both for civilian and military purposes, are transmitted via wireless RF links. A communications receiver is impacted not only by a desired signal, but by unwanted signals impinging on the receiver's antenna. These signals may be unintentional (interference) or intentional (jamming). Elimination of unwanted signals without losing diminishing the desired signal is a challenging problem made more so when the receiver and the transmitter are in motion relative to each other and to the unwanted signal sources.

In order to ensure proper operation of a receiver, it is highly desirable to know the direction as well as the power strength levels of unwanted signals. Typically, an analysis is performed on the link between the receiver and the source of an unknown signal. The link analysis provides useful information about the unwanted signal, but the results of the analysis are depicted in table or spreadsheet form and age quickly. As most receivers and signal sources are in motion relative to each other (e.g., a receiver is on a ship and a signal source is on an airplane), the volume of data over time for even a single signal source becomes significant at high sampling rates. The volume of data rises dramatically when multiple signal sources affect a receiver. Current approaches to model signal interference and jamming cannot efficiently handle all such sources simultaneously or dynamically. Additionally, current systems do not provide means to efficiently and effectively perform optimization analyses of receiver orientation to minimize interference and jamming and/or to maximize signal strength of a desired signal.

What would be useful is a system and method for visualization of attitude and attitude/position dependent data that is applied dynamically and continuously to analyzing signals arriving at a receiver. Such a system and method would account for the motion of the receiver, the transmitter, and the unwanted signal sources and would further provide means to optimize receiver orientation with respect to signal sources.

SUMMARY

Embodiments of the present invention provide a system and method for visualization of attitude and attitude/position dependent data adapted to analyzing signals arriving at a receiver that accounts for motion of the receiver, the transmitter, and the signal sources. In an embodiment of the present invention, the method provides power strength and direction of the signals and presents these data in visual and graphical form. Other embodiments of the present invention allow the receiver orientation to be optimized to minimize interference and jamming and/or to maximize signal strength of a desired signal.

It is therefore an aspect of the present invention to provide means for visualization of attitude and attitude/position dependent data.

It is another aspect of the present invention to identify desired signals, interference signals and jamming signals that impinge on a radio receiver.

It is another aspect of the present invention and to determine figures of merit (FOM) for signals that impinge on a radio receiver.

It is yet another aspect of the present invention to define an attitude sphere about a receiver, to define signals as vectors having a direction relative to the orientation of the receiver, and to associate a signal and its FOMs with an object defined at the intersection point of the signal vector and the attitude sphere.

It is still another aspect of the present invention to continuously update the attitude sphere, the receiver orientation, the signal vectors, the signal FOMs, and the signal objects.

It is an aspect of the present invention to display the attitude sphere, the receiver orientation, the signal vectors, the signal FOMs and the signal objects graphically.

It is still another aspect of the present invention to manipulate the attitude sphere, the receiver orientation, the signal vectors, the signal FOMs and the signal objects so as to optimize the desired signal reception and/or the interfering/jamming signal rejection.

Yet anoter embodiment of the present invention provides a method for visualizing attitude dependent data. An attitude sphere is defined around an object of interest located at the center of the attitude sphere. Grid points are defined on the surface of the attitude sphere. Sources of influence of the object of interest are identified. The shape of the grid and the number points in it are set by the user. The points on the grid represent directions from the center of the sphere out to its surface. Each of these directions can be used to influence some attitude dependent FOM result, which is color coded on the associated point. The attitude dependency can vary and include antenna pointing, spin axis direction, etc.

In another embodiment of the present invention, the object of interest is a radio receiver, the sources of interest are radio transmitters, and the magnitude is representative of signal power density.

These and other aspects of the present invention will become apparent from a review of the general and detailed description that follows.

DESCRIPTION OF THE FIGURES

The patent or application file contains at least one drawing executed in color. Copies of this patent or patent application publication with color drawings will be provided by the Office upon request and payment of the necessary fee.

DETAIL DESCRIPTION

Embodiments of the present invention provide a system and method for analyzing signals arriving at a receiver that accounts for motion of the receiver, the transmitter, and the signal sources. In this embodiment, the power density and direction of the signals are displayed as objects on a three dimensional sphere. The objects comprise values of figures of merit (FOMs) that are accessible to a user. Additionally, the objects are updated dynamically to depict the experience of the receiver over time. Other embodiments allow the receiver orientation to be optimized to minimize interference and jamming and/or to maximize signal strength of a desired signal.

Figure 1:
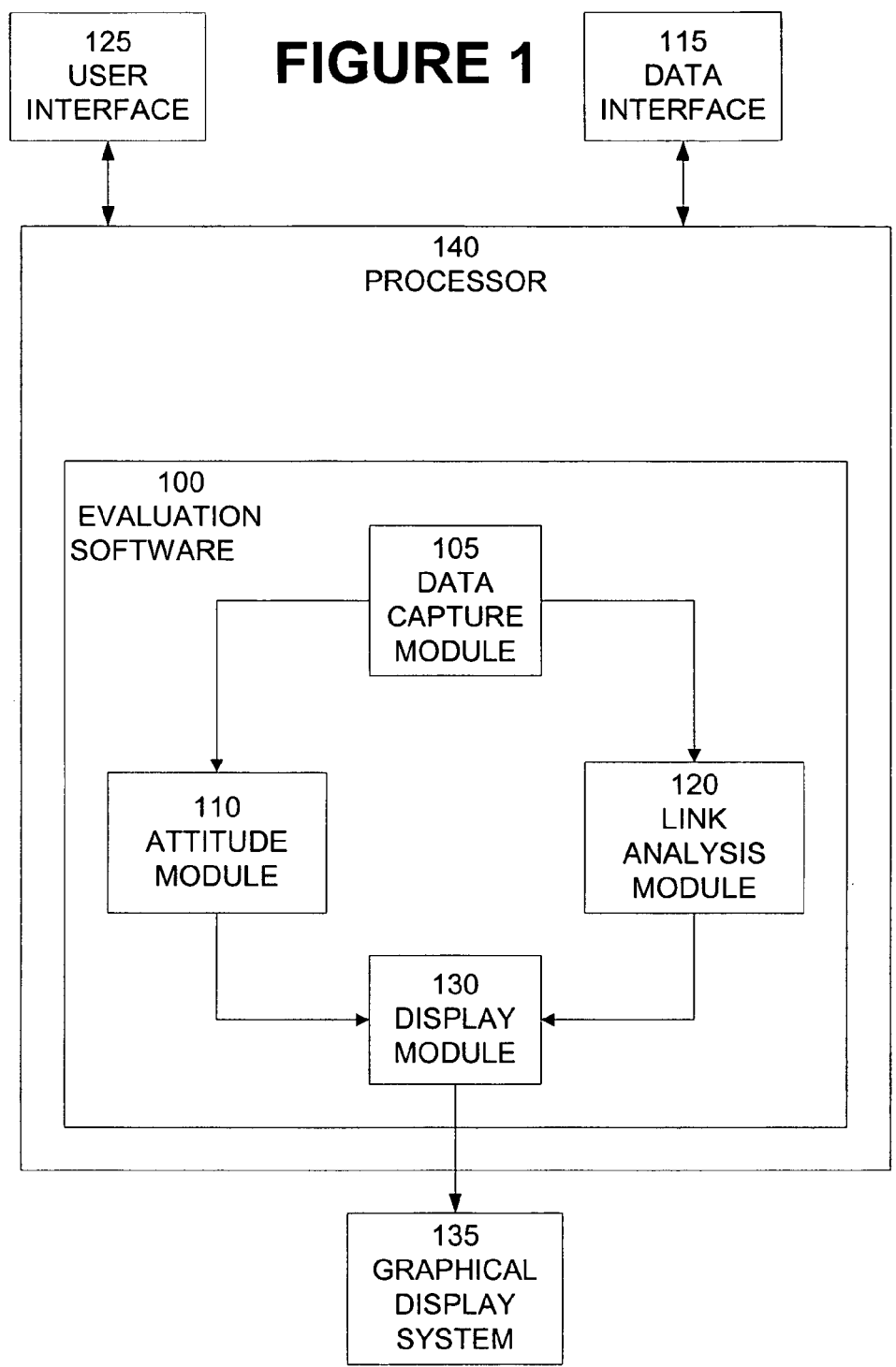
FIG. 1 illustrates a block diagram of a receiver signal evaluation software program according to embodiments of the present invention.

FIG. 1 illustrates a block diagram of a receiver signal evaluation software program according to embodiments of the present invention. Evaluation software 100 comprises a data capture module 105, an attitude module 110, a link analysis module 120 and a display module 130. Evaluation software 100 is executed on a processor 140. Data interface 115 provides data relating to signals impinging on a receiver (not illustrated) to data capture module 105 via processor 140. The data for each signal comprises a direction, a signal strength, and a source location if known. A current location, a current time, a current speed, and a current direction of movement of the receiver are also captured. User interface 125 interacts with evaluation software 100 via processor 140. User interface 125 allows a user to interact with the attitude module to set user preferences, obtain object data, to determine the effect of changes in receiver orientation, and to run optimization algorithms on the receiver in its current and future RF environments.

Attitude module 110 in conjunction with display module 130 generates display objects for depicting dynamic position and attitude parameters in a 3-dimensional space superimposed on other relevant geometric information, e.g. earth globe, digital terrain elevation data (DTED), the sun and stars, other satellites, aircraft, ground stations, etc. that are relevant to a particular analysis. Dependence on time is handled by animating, i.e., changing depictions of FOM dependencies on other parameters as time evolves. Dependence on position alone is depicted as a three dimensional color-coded grid, where location on the grid indicates position and color indicates FOM value, e.g. link availability. Attitude coverage extends this concept to dependencies on receiver orientation (attitude) and also provides an informative way to simultaneously show dependencies on both position and attitude.

In an embodiment of the present invention, the dependency on attitude, attitude coverage is reevaluated in terms of a vector (a direction in space). The direction in space is varied, which affects attitude, which in turn affects analyzed FOMs. There are many ways in which a vector can affect attitude. For example, a grid direction is selected to represent an antenna (or sensor) bore sight. The antenna (or sensor) is pointed along different directions on the grid and analysis is performed in each case. In another example, a vector can be used directly as a spin vector for spinning satellites or it can be used as an alignment vector making satellites continuously face along its direction.

Figure 2:
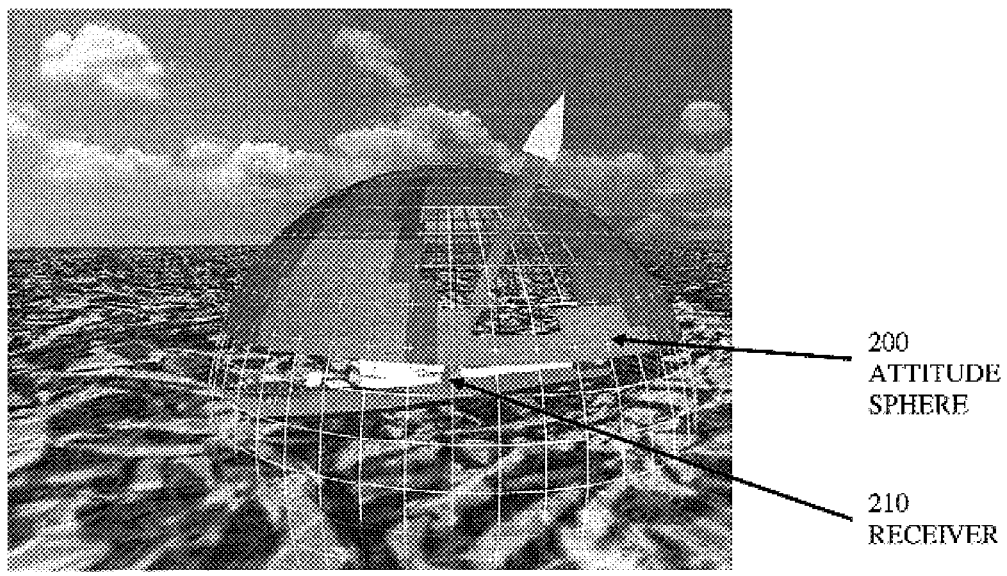
FIG. 2 illustrates an attitude sphere centered on a receiver according to an embodiment of the present invention.

FIG. 2 illustrates an attitude sphere centered on a receiver according to an embodiment of the present invention. Referring to FIG. 2, attitude coverage defines a set of grid points on a sphere (an "attitude sphere") 200. The sphere is centered on a current position of the receiver 210. Each grid point 215 is associated with a grid direction from the center of the sphere through the point. The sphere is aligned with the coordinate frame in which grid directions are fixed, e.g. body frame, inertial frame, etc. This means that while directions are fixed in the sphere's frame, they can be rotating with the sphere with respect to other coordinate frames. Also, the center of the sphere can be moving relative to other objects, so any particular grid direction changes it geometric relationships with the other objects due to these positional changes.

In another embodiment of the present invention, each grid block on the attitude sphere 200 is color-coded based on FOM value, which provides a distinctly instructive and direct depiction of attitude dependencies.

Referring again to FIGS. 1 and 2, link analysis module 120 analyzes incoming data from data capture module 105 to determine parameters for each radio signal that intersects the attitude sphere 200 surrounding the receiver 210 at a particular time. Vector lines are drawn from signal sources to the receiver. These directional vector lines are measured using two angles (e.g. degrees from the true North and the degrees above or below the receiver's plane of reference). In order to locate the proper direction of the incoming unwanted signal (particularly where the location of the source of the unwanted signal is unknown), the receiver 210 is considered at the center of attitude sphere 200. Each point on the attitude sphere 200 where the directional vector lines intersect the sphere represents the signal source.

In an embodiment of the present invention, values of jamming/interfering signal strength levels are represented by a color-coded shapes (the area of the shapes can be made larger or smaller based on the resolution of the desired information) mapped on to attitude sphere 200. When displayed, the resulting attitude sphere 200 presents a complete picture of the jamming/interfering situation (directions as well as the signal strength) all around the receiver 210. The users of the receiver 210 can use the information from this picture to help mitigate the impact of at least some of these unwanted signals.

The link analysis is run for all positional and directional grid points and provided to display module 130. Display 135 displays all of the results simultaneously thereby providing a window for investigating the effect that position and attitude changes have on communication links. In yet another embodiment, the data capture module 105 polls data interface 115 for new data and provides the updated data to attitude module 110 and link analysis module 120. The attitude module then revises the attitude sphere 200 and the link analysis module revises the link analysis for each grid point. Display module 130 maps the new link analysis data to the revised attitude sphere 200 and sends the results of this mapping to the display 135.

Attitude coverage also facilitates a unique simultaneous illustration of FOM dependencies on both position and attitude. To accomplish this, attitude spheres are placed at every location on the positional grid. In an exemplary embodiment, the duration of communication link between a portable antenna and a set of satellites in the presence of interfering transmitters is maximized according to this method. A positional grid of possible antenna locations is defined. An attitude grid is assigned on each positional grid point. The attitude grid occupies the top half of the attitude sphere. The analysis software computes the coordinates of each grid point. These coordinates are used as the current attitude of the receiver to perform the interference/jamming analysis at that grid point. This process is repeated for each and every grid point on the grid defined around the attitude sphere.

In an embodiment of the present invention, the attitude analysis is also combined with the communications receiver jamming/interference analysis. The communications receiver operation is greatly impacted by the unwanted signals coming to the receiver's antenna. These signals may be unintentional (interference) or intentional (jamming). In order to ensure proper operation of the receiver, it is highly desirable to know the direction as well as the power strength levels of these unwanted signals. Mitigation techniques are then invoked to reduce or to eliminate the impact of the unwanted signals. By way of illustration and not as a limitation, mitigation techniques comprise changing the orientation of the receiver antenna to reduce the impact of the interfering sources and using active antennas which, given the direction and the power of the interfering signals, can reconfigure their gain pattern such that the gain in the direction of those interfering sources is extremely low.

The direction of arrival of an incoming signal is computed from the dynamic relative positions of the receiver and the interfering/jamming transmitter. The user of the analysis software models the scenario with the interfering and jamming sources. The locations and characteristics of a transmitter are declared by the user. In a real world scenario, signal measurement devices are employed to measure the signal strength and the direction of the interfering sources. Once these data are measured then the knowledge of the exact position of the interfering source is not essential for further analysis.

A communications link analysis is performed on each signal coming from each transmitter. The analysis takes the transmitter power and subtracts the propagation losses to compute a signal power level at the receiver. These signals are classified as wanted or unwanted and their relative ratios are computed to determine the level of interference. These analyses are carried out over all directions around the attitude sphere to compute the values on each point on the surface of the sphere. The user may define the resolution of the points on the attitude sphere.

For graphical representation different interference/jamming FOM value levels are assigned different colors. By way of illustration and not as a limitation, higher interference values are represented by the stronger shades of red and lower values are shown by the lighter shades of blues etc. The users may select a color-to-value to relationship to control the graphical presentation.

The present inventors have implemented and incorporated the present invention using the Satellite Tool Kit® (STK) v. 6.1 or higher, available from Analytical Graphics of Malvern, Pa. In use, the STK/Comm module empowers users to define and analyze detailed communications systems. This module lets users generate detailed link budget reports and graphs, visualize dynamic system performance in 2-D and 3-D Windows, and incorporate detailed rain models, atmospheric losses, and RF interference sources in their analyses.

Users can then quickly build high-fidelity system models by customizing, to various levels of detail, STK communication system components. Receiver and transmitter models may be attached to other STK objects, like satellites, aircraft, ships, facilities, ground vehicles, and planets, to facilitate rapid scenario building and analysis. STK/Comm has a number of available antenna models. Alternatively, antenna patterns can be imported from SATSOFT™ (formerly CPLAN), the ITU GIMROC database, or user-defined pattern files. Users can also define multi-beam antennas and STK/Comm can compute the aggregate beam and display the contours in 2-D and 3-D.

Complete link analysis can be done over time using STK's satellite orbit propagation/geometry engine coupled with the defined receiver and transmitter properties. Time-varying constraints such as Doppler shift and bit error rate linked with a full range of environmental models enable STK/Comm to provide link performance analysis that cannot be done by prior art spreadsheets. STK/Comm works with the STK/Coverage and STK/Attitude modules to compute and display jamming and interference analyses on Coverage grids and Attitude spheres, respectively.

STK/Comm lets users quickly identify when their link will meet the desired performance criteria. All typical link parameters may be analyzed including frequency, RIP, C/N, C/No, Eb/No, and Bit Error Rate. STK/Comm allows users to choose the level of detail they want in the communication system being modeled—ranging from simple models like isotropic transmitters and receivers to complex antenna patterns and system-temperature modeling. STK/Comm antenna types include Gaussian, parabolic, square horn, non-uniform aperture, dipole, helix, hemispherical, GPS global beam, multi-beam, and custom types such as several ITU standards as well as importable from ITU GIMROC database, Intelsat, and user-defined from an external file. These transmitter and receiver types—coupled with nearly all standard modulation schemes, polarization types, system noise temperatures (line loss, line temperature, antenna noise), spread-spectrum modeling, RF environment modeling (space loss, rain rate, gaseous absorbtion), auto-track frequency, auto-scale bandwidth, and user-defined inputs such as transfer functions, pre-receive gains, pre-demod gains, and post-transmit gains—provides unparalled flexibility for defining communications systems and performing analysis on various aspects of the system.

STK/Comm provides a full range of environment models, including the following empirical rain models—Crane 1982, Crane 1985, CCIR 1983, and ITU-R P.618. Gaseous absorption effects are also calculated via user-defineable water vapor content and temperature. For further flexibility, the empirical rain models can be overridden with user-defineable outage percentage and rain rate.

Multi-beam transmitter and receiver models require multi-beam antennas in communications link analysis. Within STK/Comm, each beam may be setup as an independent antenna by specifying its frequency, RF power level, polarization state, gain characteristic type, etc. Each beam's boresight directions can also be oriented independently. A unique user interface facilitates positioning of the beams just by selecting and dragging the beam boresights and three dB gain contours show the coverage instantaneously on the GUI panel. Different beam selection criteria, such as "maximum gain" toward a receiver or "minimum boresight angle" in the direction of a communications link, can be employed to help model varying operational strategies.

STK/Comm performs network interfence analysis as well target interference analysis. For network interference analysis, STK/Comm enables users to define a communication system and a "network" of potential interferers. STK/Comm quickly calculates the impact of the interference network into communication links and presents the results as time-ordered data and statistical summaries using probability density functions (PDFs) and cumulative density functions (CDFs) and also highlights the interferers during the STK animation period on both the 2-D projection and 3-D globe within STK/Advanced VO. Paired with the STK/Coverage or STK/Attitude module, STK/Comm can display jamming/interference contours on the 3-D Attitude sphere. Users can also investigate the C/(N+I), C/I, DT/T, and power flux density.

Interference analysis for a specific link (e.g., ground station to a target) can be accomplished quickly by leveraging STK's satellite database containing more than 10,000 NORAD tracked and cataloged orbiting objects. Combined with a user-supplied RFI database file characterizing the transmit and receiver threshold for the satellites of interest, STK/Comm can quickly identify which satellite may cause or be susceptible to radio-frequency interference from a ground station.

STK/Comm leverages benefits of other modules in the STK suite, enabling users to practice the present invention. For example, the STK suites use STK/Comm with: STK/Connect® can be used to perform parametric analysis; STK/Coverage to generate statistics on cumulative link performance across a geographical region or analyze the effect of link availability on navigation quality; and STK/Attitude to compute and display jamming or interference analysis on over an attitude grid.

Indeed, STK/Coverage module gives a user the ability to measure the quality of coverage through FOM definitions, including the standard Dilution of Precision and navigational accuracy measurements used in Global Positioning System (GPS) calculations.

These criteria, briefly described below, establish relevant parameters for the coverage scenario:

Simple Coverage—measures whether or not a point is covered.

N Asset Coverage—measures the number of assets available simultaneously during coverage.

Coverage Time—measures the amount of time during which grid points are covered, either in total time, time per day, or as a percentage.

Revisit Time—measures the duration of intervals during which coverage is not provided.

Access Duration—measures the duration of individual coverage intervals.

Number of Accesses—measures the number of independent accesses of points.

Number of Gaps—measures the number of gaps in coverage of points.

Access Separation—measures if a point has coverage from multiple assets within a user-defined time tolerance.

Time Average Gap—measures the average length of the coverage gap found if sampled randomly.

Response Time—measures the time between a request for coverage at a point and the time at which the coverage is achieved. You may select mean, min/max, or Nth-percentile values.

Access Constraint—measures the value of a user-selected visibility constraint such as elevation angle or slant range.

Dilution of Precision—measures the relative level of the uncertainty of a navigation solution due to the relative geometry of the transmitter locations (i.e., Geometric, Position, Horizontal, Vertical, and Time).

Navigation Accuracy—measures the uncertainty of a navigation solution based on one-way range measurements from a set of transmitters. Most often, the transmitters are those on board GPS satellites.

The STK/Attitude module is a dynamic attitude modeling and simulation component for the integrated STK solution. It provides system engineering tools that let mission planners assess realistic attitude profiles in conjunction with STK's validated ephemeris generation capabilities. By building on the STK Vector Geometry engine, the Attitude module allows countless user-defined attitude profiles to be flown and analyzed against mission design requirements. Users can take advantage of the 3-D Attitude View to see the results of a satellite's propagated attitude as projected into any reference frame. Whether the application is remote sensing, communication, or missile defense, STK/Attitude provides for a customized solution to meet the specific requirements of that system.

STK/Attitude users may construct attitude profiles to align the vehicle's body axes with any axes or vector either predefined or built with the STK Vector Geometry Tool, e.g., aligned with the sun for battery recharging. Additionally, multiple attitude segments may be threaded together over the vehicle ephemeris to represent multiple maneuver sequences or mission modes. Segments may be either coordinate-based, targeted, or file-driven. User-defined slew segments can be used to govern the transition between individual attitude modes.

The Attitude View window allows an analyst to view pertinent information within a three dimensional environment. The data source may be STK or a legacy system integrated via the STK/Connect module. This output medium provides instant intuitive feedback when evaluating attitude profiles against mission requirements. Attitude View also builds on the STK Vector Geometry Tool by making available for display any pre-defined or user created vector/axes associated with the vehicle. In addition the arc connecting any two vectors or its projection into any plane (dihedral) defined by a third vector may be displayed along with its angular measure. Also available is an attitude sphere representing the right ascension and declination in any user desired vehicle reference frame. Vectors can be traced over any period of time on or about the surface of the attitude sphere. In addition, the Earth limb, sun, moon, and any celestial objects included in a scenario as well as any vehicle sensors may be projected onto the sphere. Each vector/axis is also available for defining and constraining the users' view of the vehicle.

STK/Attitude also includes a simulation capability via MATLAB®, VBScript, or Perl plug-ins. Along with the various torque-free attitude modes of STK, the simulation capability lets the user introduce various disturbing forces such as atmospheric drag, solar radiation pressure, and gravity, as well as the effects of open- and closed-loop control on the resulting spacecraft attitude. All of STK's orbit propagation, environmental modeling and geometric computation capabilities are available to the simulation interface. For maximum accuracy it also takes advantage of proven STK integrators such as Runge-Kutta-Fehlberg and Bulirsch-Stoer. Multiple plug-ins can be executed at various times and frequencies throughout the attitude simulation. Plug-in computations may range from changing control gains or switching from one attitude control mode to another to direct implementation of the control law itself. Plug-ins can even register additional variables to be integrated along with spacecraft attitude, which is needed for modeling of dynamic compensators. The nature of the plug-in interface is such that the user is free to define as simple or as complex a control law as desired. MATLAB plug-ins can take full advantage of MATLAB's analytical capabilities and users of the STK/MATLAB Interface can also utilize the capabilities of the STK Aerospace Tool Box. The plug-ins, created in several script languages mentioned above, can all share information through STK. For example, speed critical scripts that are executed at high frequency can be tested in MATLAB and then compiled into DLLs, whereas other scripts that are not executed as often or may require frequent changes can be kept in a script form. These capabilities combine to provide the ultimate flexibility for quickly prototyping new controls or evaluating the performance of existing ones with accurate environmental, geometric, and position data.

STK/Attitude, when partnered with STK/Coverage, STK/Comm, and STK/Advanced VO, gives users additional analytical and visualization capabilities in accordance with the present invention. Users can compute and visualize any relevant STK/Coverage figure of merit on a vehicle's attitude sphere; for example, users can calculate a GPS Dilution of Precision and display it in 3-D on the attitude sphere of a ship, for navigation analyses. When the Attitude module is paired with STK/Comm, users can compute and display jamming/interference analysis on the attitude sphere. STK/Advanced VO makes all these dynamic 3-D visualizations possible.

Figure 3:
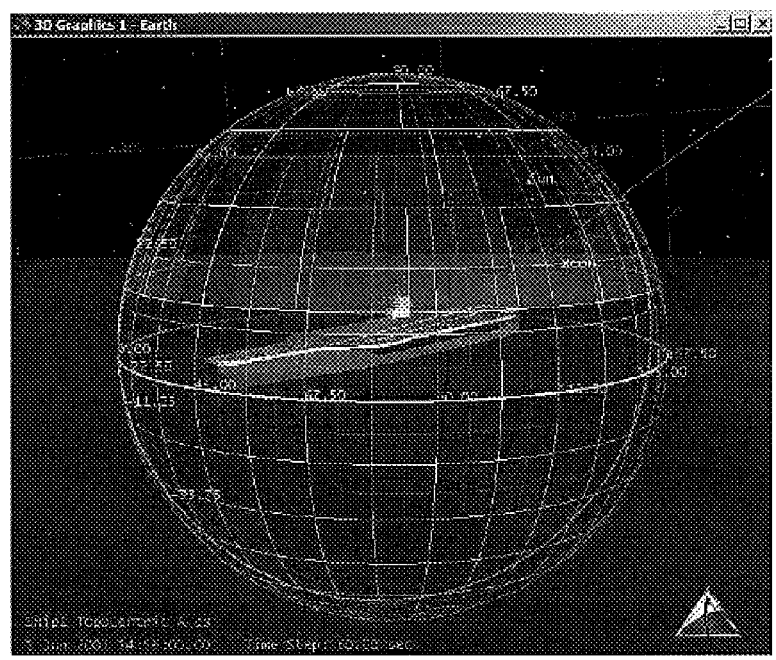
FIG. 3 illustrates an exemplary attitude sphere visualization as produced by software incorporating an embodiment of the present invention.

In a preferred embodiment, STK/Attitude Coverage combines features of STK/Attitude and STK/Coverage to enable a user to analyze coverage in various directions over time, using several attitude-dependent figures of merit. FIG. 3 illustrates a typical display as produced by this software.

The following is an example of a use of the STK/Attitude Coverage module to practice an embodiment of the present invention by setting up a relatively simple illustration of how Attitude Coverage can be applied to a common analytical and planning task: determining the best direction in which to point an Earth-based sensing device over a period of time to have access to the maximum number of satellites in a constellation. The example assumes that a user is familiar with the use of the STK software.

To set the scene, the context for the attitude coverage analysis of this example is a ship crossing the equator near the South American coast, equipped with a sensor that needs to maintain access to as many satellites as possible in a constellation of middle-earth orbiting (MEO) satellites. An attitude sphere centered on the ship is used for visualization of the results of pointing the sensor in various directions over time. The following steps in STK accomplish this:

Create a scenario with the default Time Period (1 Jun. 2003 12:00 to 2 Jun. 2003 12:00 UTCG).

Create a ship. On its (Basic) Route page, select Smooth Rate as the Route Calculation Method, and enter two waypoints: 5 deg latitude, −95 deg longitude; and −5 deg latitude, −85 deg longitude.

Open the ship's Attitude Sphere page and check the Show box.

Attach a sensor to the ship. On its Definition page, set Cone Angle to 70 deg.

On the sensor's 3D Graphics Attributes page, set % Translucency to 100 (This is to avoid displaying the sensor cone in 3D, which would interfere with the display of the attitude sphere).

Use the Orbit Wizard to create a satellite with a Circular Orbit and an Altitude of 6000 km.

Use the satellite just created as the seed for a Walker constellation of 6 planes with 4 satellites each. Check the Create Constellation box and give the constellation a name.

The next steps set up the attitude coverage. The points and regions defined for attitude coverage represent directions in which the attitude-dependent object (here, a sensor) can be pointed:

With the ship selected in the Object Browser, create an AttitudeCoverage object.

On the Grid page, select Latitude Bounds as the type, set Min. Latitude to 5 deg, and leave Max. Latitude at 90 deg. (This excludes from consideration all directions less than 5 degrees above the horizon).

Click the Associate Class . . . button, check the Use Object Instance Box, select Sensor as the Object Type, highlight the sensor, and click OK.

On the Assets page, assign the constellation and make certain that the selected Grouping option is Separate.

On the 3D Graphics Attributes page, check the Show Regions box and leave other options unchecked.

This completes the setup of the AttitudeCoverage object. With it still highlighted in the Object Browser, select Compute Accesses from the AttitudeCoverage menu. The subsequent steps define a figure of merit (FOM). The purpose of the analysis is to determine the best directions in which to point the sensor, over the relevant time interval, to maximize its access to the satellites in the constellation:

Create an AttitudeFigureOfMerit object. On the Definition page, set the Type to N Asset Coverage and the Compute option to Minimum. Do not enable Satisfaction.

On the 3D Graphics Attributes page, turn Static Graphics off and Animation Graphics on. Set Accumulation to Current Time, and check the Fill Points box.

On the 3D Graphics Contours page, select Static as the Type, and check the Show box. Using Start, Stop, Step as the Add Method, set a Start value of 0, a Stop value of 6, and a Step of 1, and click the Add Levels button. Assign a color to each level, or use the Color Ramp method to assign a segment of the spectrum over the contour levels. Optionally set up a Legend for static contours (Although you will first look at dynamic contours, it is more efficient to go ahead and set up static contours at this point, since dynamic (animation) contour settings can be inherited from the static settings).

Now change the contours Type to Animation, and check the Show and Use Static Contours boxes. Optionally set up a legend for dynamic contours.

Figure 4:
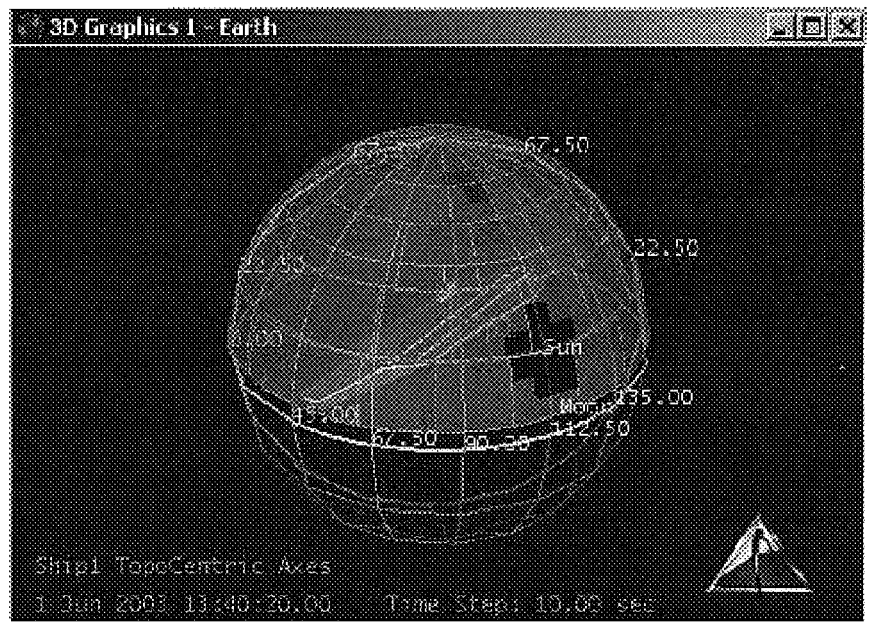
FIG. 4 illustrates an exemplary frame of an animated attitude sphere visualization as produced by software incorporating an embodiment of the present invention.

The final set of steps is used to display dynamic contours to obtain a display as shown in FIG. 4. As a user animates the 3D Graphics window, the attitude sphere will display a changing contour pattern, reflecting, at each time step, the quality of coverage (i.e., the number of satellites to which the sensor would have access) in each direction.

In the 3D Graphics window toolbar, click the View Position and Direction button, and set the view from and to the ship.

Animate the scenario and observe the changing contour pattern.

Stop the animation, open the sensor's Sun Constraints page, and set a 10 deg Solar Exclusion Angle.

Accesses will automatically be recomputed.

Animate again and note the effect of the position of the Sun on coverage.

Since the compute option for the figure of merit definition is set to Minimum, the static contours based on this figure of merit will indicate the minimum number of satellites to which the sensor has access at any time during the analysis interval in each direction included in the coverage definition. That is, a pessimistic picture is painted.

Figure 5:
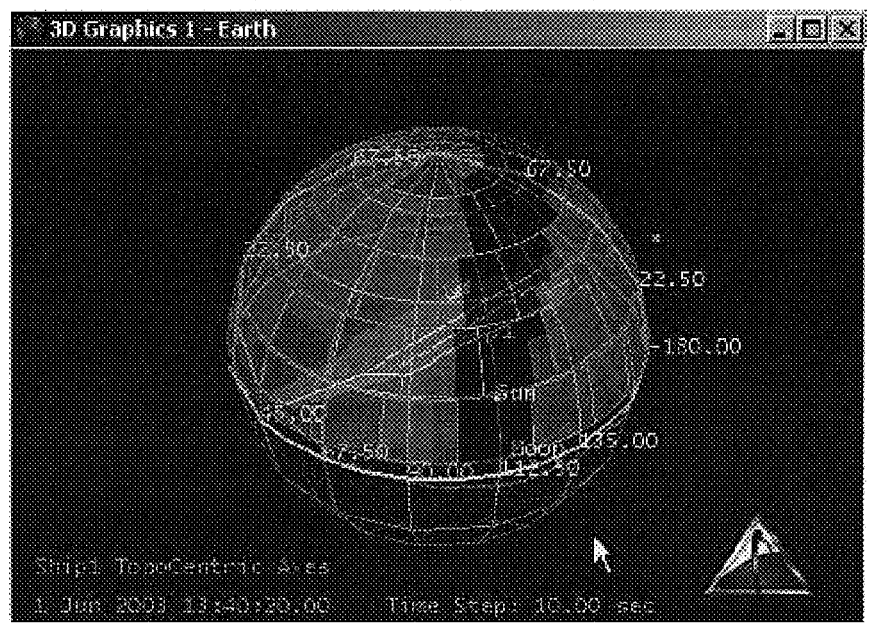
FIG. 5 illustrates an exemplary static graphic of attitude sphere visualization as produced by software incorporating an embodiment of the present invention.

If a user returns to the 3D Graphics Attributes page for the figure of merit, turns off Animation Graphics, turns on Static Graphics, and checks the Fill Points box, a 3D Graphics window of FIG. 5 will be produced. A rather large area, shown in STK as light green, has a coverage level of 2, i.e., if the sensor is pointed in any direction within that area, it will always have access to at least two satellites. Note the path (shown in STK as red) in which coverage is at level 0 because of the solar exclusion angle constraint.

Figure 6:
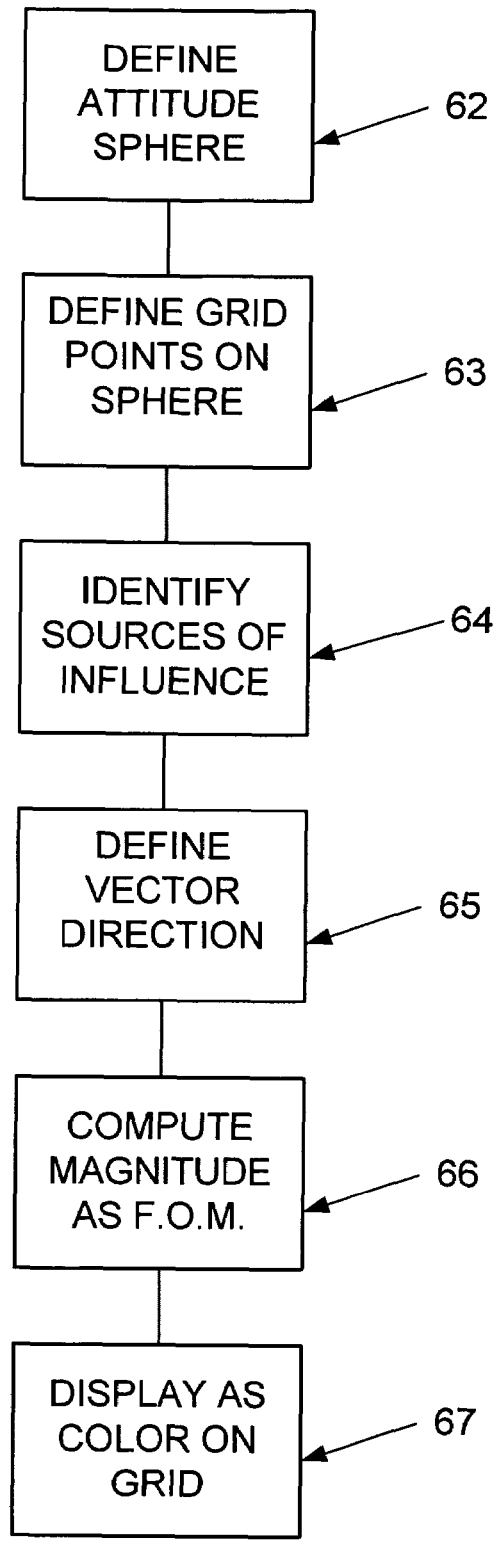
FIG. 6 illustrates a flow chart of an embodiment of the present invention.

In one embodiment, as illustrated in FIG. 6, the present invention is drawn to a method for visualizing attitude dependent data comprising: defining an attitude sphere 62 around an object of interest, wherein the object of interest is located at the center of the attitude sphere; defining grid points 63 on the surface of the attitude sphere; identifying sources of influence 64 of the object of interest; defining a vector direction 65 from the object of interest to a grid point; computing magnitude of a vector as a figure of merit value 66 given direction of the vector and locations of the sources of influence; and displaying the attitude sphere graphically wherein each grid point is assigned a grid color determined by the magnitude of the associated vector, 67.

Within this embodiment, the object of interest can be a radio receiver, the sources of influence can be other radio transmitters, and the magnitude can be representative of signal power density. Similarly, changes in the attitude dependent data can be visualized over time or based upon changes in object parameters, such as antenna or sensor type or direction. In another embodiment, the present invention is drawn to a system for visualizing attitude dependent data comprising: means for defining an attitude sphere around an object of interest, wherein the object of interest is located at the center of the attitude sphere; means for defining grid points on the surface of the attitude sphere; means for identifying sources of influence of the object of interest; means for defining a vector direction from the object of interest to a grid point; means for computing magnitude of a vector as a figure of merit value given direction of the vector and locations of the sources of influence; and means for displaying the attitude sphere graphically wherein each grid point is assigned a grid color determined by the magnitude of the associated vector. This system can also comprise means for visualizing changes in the attitude dependent data over time or based upon changes in object parameters, such as antenna or sensor type or direction.

A system for the visualization of attitude and attitude/position dependent data, and a method therefore, have been illustrated. Additionally, the systems and methods may be embodied in other specific forms without departing from the scope of the invention disclosed and the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A method for visualizing attitude dependent data comprising:
    defining an attitude sphere around an object of interest, wherein the object of interest is located at the center of the attitude sphere;
    defining grid points on the surface of the attitude sphere;
    identifying sources of influence of the object of interest;
    defining a vector direction from the object of interest to a grid point;
    computing magnitude of a vector as a figure of merit value given direction of the vector and locations of the sources of influence; and
    displaying the attitude sphere graphically wherein each grid point is assigned a grid color determined by the magnitude of the associated vector.

2. The method for visualizing attitude dependent data of claim 1, wherein the object of interest is a radio receiver; wherein the sources of influence of the object of interest comprise radio transmitters and wherein the magnitude is representative of signal power density.

3. The method of claim 1, further comprising visualizing changes in the attitude dependent data over time.

4. The method of claim 1, further comprising visualizing changes in the attitude dependent data based upon changes in object parameters.

5. A system for visualizing attitude dependent data comprising:
    means for defining an attitude sphere around an object of interest, wherein the object of interest is located at the center of the attitude sphere;
    means for defining grid points on the surface of the attitude sphere;
    means for identifying sources of influence of the object of interest;
    means for defining a vector direction from the object of interest to a grid point;
    means for computing magnitude of a vector as a figure of merit value given direction of the vector and locations of the sources of influence; and
    means for displaying the attitude sphere graphically wherein each grid point is assigned a grid color determined by the magnitude of the associated vector.

6. The system of claim 5, further comprising means for visualizing changes in the attitude dependent data over time.

7. The system of claim 5, further comprising means for visualizing changes in the attitude dependent data based upon changes in abject parameters.

8. A communications receiver interference analysis system comprising:
    a communications receiver;
    a processor connected to a data interface and a user interface and adapted to execute evaluation software, the evaluation software comprising:
        a data capture module adapted to receive signal data from the data interface relating to signals impinging on the receiver;
        an attitude module adapted to:
            define an attitude sphere around the receiver, wherein the receiver is located at the center of the sphere;

define grid points on the surface of the attitude sphere;

define a vector direction from the receiver to a grid point;

compute a magnitude of a vector as a figure of merit value of the signal data; and a link analysis module, adapted to determine link measures using the figures of merit associated with the grid point;

a display module adapted to generate display objects in a three-dimensional space comprising the attitude sphere, the grid points, and the link measures; and a display adapted to receive and display the display objects from the display module.

9. The system of claim 8, wherein different link measures are displayed as different colors.

* * * * *